US006456776B2

(12) United States Patent
Hetzer

(10) Patent No.: US 6,456,776 B2
(45) Date of Patent: Sep. 24, 2002

(54) CONFIGURATION FOR DETECTING MAIL ITEMS

(75) Inventor: Ulrich Hetzer, Berlin (DE)

(73) Assignee: Francotyp Postalia AG & Co. KG., Birkenwerder (DE)

( * ) Notice: Subject to any disclaimer, the term of this patent is extended or adjusted under 35 U.S.C. 154(b) by 0 days.

(21) Appl. No.: 09/840,554

(22) Filed: Apr. 23, 2001

(30) Foreign Application Priority Data

Apr. 22, 2000 (DE) ........................................ 100 21 250

(51) Int. Cl.$^{7}$ .................................................. G02B 6/00
(52) U.S. Cl. .......................................... 385/147; 384/12
(58) Field of Search ....................... 385/12; 250/227.11, 250/227.31, 227.26, 566

(56) References Cited

U.S. PATENT DOCUMENTS

| | | | | |
|---|---|---|---|---|
| 4,744,554 A | | 5/1988 | Kulpa et al. | |
| 5,321,436 A | * | 6/1994 | Herbert | 250/568 |
| 5,526,271 A | * | 6/1996 | Abumehdi | 705/403 |
| 5,712,934 A | * | 1/1998 | Johnson | 250/339.11 |
| 6,300,082 B1 | * | 10/2001 | Erb et al. | 271/10.01 |
| 6,364,306 B1 | * | 4/2002 | Kunde et al. | 385/12 |
| 6,366,722 B1 | * | 4/2002 | Murphy et al. | 385/12 |

FOREIGN PATENT DOCUMENTS

| | | |
|---|---|---|
| DE | 30 14 473 A1 | 10/1981 |
| DE | 37 34 268 A1 | 4/1988 |
| DE | 41 13 720 C2 | 10/1992 |
| DE | 43 09 773 A1 | 9/1994 |
| DE | 44 37 348 A1 | 4/1996 |
| DE | 298 23 319 U1 | 5/1999 |
| EP | 0 634 625 A2 | 1/1995 |
| EP | 0 848 233 A1 | 6/1998 |
| GB | 2 187 718 A | 9/1987 |
| GB | 2 235 656 A | 3/1991 |

* cited by examiner

*Primary Examiner*—Robert H. Kim
*Assistant Examiner*—Richard Kim
(74) *Attorney, Agent, or Firm*—Laurence A. Greenberg; Werner H. Stemer; Gregory L. Mayback

(57) ABSTRACT

A configuration for detecting mail items includes rigid optical waveguide elements between a monitoring location and transmitting and receiving devices on a main printed circuit board. The configuration makes use of a transmitted-light principle for detecting mail items to be franked.

13 Claims, 2 Drawing Sheets

CONFIGURATION FOR DETECTING MAIL ITEMS

BACKGROUND OF THE INVENTION

FIELD OF THE INVENTION

The invention concerns a configuration for detecting mail items and is to be used in franking machines and other devices for processing mail that involve the transport of mail items.

Modern franking machines, such as the thermal transfer franking machine described in U.S. Pat. No. 4,746,234, make use of fully electronic digital printing devices. This makes it possible in principle to print any required text and special characters, and any required advertising block or an advertising block allocated to a cost center, in the area stamped by the franking machine. For example, the company Francotyp-Postalia AG & Co. produces the franking machine model T1000 with a microprocessor, which is enclosed in a secure housing with an opening for feeding in a letter. If a letter is fed in, a mechanical letter sensor, in this case a microswitch, transmits a print instruction to the microprocessor. The franked (stamped-on) impression contains postal information which is needed for forwarding the letter and which was entered and stored beforehand. U.S. Pat. No. 5,949,444, which corresponds to German Patent No. DE 196 05 015 C1, discloses an embodiment of a printing device which is known under the trademark JetMail®. This printing device uses an ink jet printing head provided in a stationary position in a recess behind a guide plate and produces a franked imprint during a non-horizontal, almost vertical letter transport. A sensor for triggering the printing process is provided just upstream of a recess for the ink jet printing head, wherein the sensor for triggering the printing process functions in combination with an incremental sensor.

U.S. Pat. No. 5,495,103 corresponding to European Patent No. EP 673 001 B1 describes a triggering of the printing process through an optical mail item sensor. The optical mail item sensor is constructed as a reflection light barrier. The surface of the letter should therefore ideally be as even or as flat as possible, in particular at the leading edge of the letter, as otherwise a reflection light barrier is disadvantageous in the detection of the leading edge of thick mail items.

For this reason the printing process in the printing device known under the trademark JetMail® is preferably triggered by a transmitted-light barrier or through-beam light barrier of the franking machine (see also Published European Patent Application No. EP 901 108 A2). This allows to clearly detect the front edge even of thick mail items. In addition, the JetMail® printing device also makes use of optical sensors for detecting mail item jams. Providing the main printed circuit board at a distance behind the guide plate requires the use of screened copper cables. High costs are generated not only by the manufacture of both reflection sensors and transmitted-light sensors (through-beam light sensors), but also by their installation, which involves fixing them to the guide plate and providing plug-in connectors with cables to the main printed circuit board in the base.

SUMMARY OF THE INVENTION

It is accordingly an object of the invention to provide a configuration for detecting mail items which overcomes the above-mentioned disadvantages of the heretofore-known configurations of this general type and which has a robust sensor technology for detecting letters at low manufacturing costs.

With the foregoing and other objects in view there is provided, in accordance with the invention, a configuration for detecting mail items, including:

a main printed circuit board having a controller, the main printed circuit board defining a monitoring location spaced at a given distance from the main printed circuit board;

a transmitter disposed on the main printed circuit board;

a receiver disposed on the main printed circuit board;

rigid optical waveguide elements provided between the monitoring location and a respective one of the transmitter and the receiver; and the rigid optical waveguide elements being configured, at the monitoring location, in accordance with a transmitted-light principle, for detecting mail items.

A franking machine or other mail processing device involving the transport of mail items has a housing or case with an opening for feeding in the mail items and with an internally provided main printed circuit board for the control. Providing as many of the electronic components as possible on the main printed circuit board makes it unnecessary to have a costly installation of a transmitting device and a receiving device near the transport path in the opening for feeding in the mail items. The separation between the main printed circuit board and the monitoring location in the opening is bridged, according to the invention, through the use of rigid optical waveguide elements. The rigid optical waveguide elements and the transmitting device and the receiving device on the main printed circuit board serve to detect the item to be franked at the monitoring location according to the known transmitted-light principle (through-beam principle), whereby relative to the direction of flow of mail the monitoring location is provided upstream from a printing head located in a printing position.

In accordance with another feature of the invention, the rigid optical waveguide elements include a first rigid optical waveguide element provided between the monitoring location and the transmitter and a second rigid optical waveguide element provided between the monitoring location and the receiver.

In accordance with yet another feature of the invention, a housing having a slot-shaped opening is provided, the main printed circuit board, the transmitter, the receiver, and the rigid optical waveguide elements are disposed in the housing, the slot-shaped opening has two sides and defines a transport path, and the rigid optical waveguide elements are disposed, at the monitoring location and close to the transport path, at a respective one of the two sides of the slot-shaped opening.

In accordance with a further feature of the invention, the main printed circuit board, the transmitter, the receiver, and the rigid optical waveguide elements form a detection device, and the housing encloses the detection device except at the slot-shaped opening.

In accordance with another feature of the invention, the given distance is a first distance, the two sides of the slot-shaped opening are disposed opposite one another, a guide plate is formed at a first one of the two sides, the guide plate is configured such that a mail item rests against the guide plate and such that a transport force is exerted on the mail item in a direction of transport, and the main printed circuit board is provided at the first distance from the guide plate and at a second distance from a second one of the two sides wherein the first distance is greater than the second distance.

In accordance with yet another feature of the invention, one of the rigid optical waveguide elements is disposed at one of the transmitter and the receiver, and the one of the rigid optical waveguide elements is an I-shaped, rigid optical waveguide element.

In accordance with a further feature of the invention, one of the rigid optical waveguide elements is disposed at one of the transmitter and the receiver, and the one of the rigid optical waveguide elements is an I-shaped, rigid optical waveguide element and has a length substantially equal to the second distance.

In accordance with another feature of the invention, one of the rigid optical waveguide elements is a U-shaped, rigid optical waveguide element with a first leg and a second leg, the first leg has a first length such that the first leg substantially reaches one of the transmitter and the receiver, the second leg has a second length, the second length is shortened by a length substantially equal to the given distance, and the second leg is disposed closer to a transport path at the monitoring location than the first leg.

In accordance with yet another feature of the invention, the rigid optical waveguide elements are transparent plastic optical waveguides for localizing and concentrating a light beam.

In accordance with an additional feature of the invention, the transmitter is a clocked light-emitting diode for minimizing extraneous light and for increasing detection reliability.

In accordance with another feature of the invention, a printing head is located, when in a printing position, downstream of the monitoring location with respect to a transport direction.

With the objects of the invention in view there is also provided, a franking machine configuration, including:

a franking machine including a housing, the housing having a slot-shaped opening formed therein;

a main printed circuit board having a controller, the main printed circuit board defining a monitoring location spaced at a given distance from the main printed circuit board;

a transmitter disposed on the main printed circuit board;

a receiver disposed on the main printed circuit board;

rigid optical waveguide elements provided between the monitoring location and a respective one of the transmitter and the receiver;

the rigid optical waveguide elements being configured, at the monitoring location, in accordance with a transmitted-light principle, for detecting mail items;

the main printed circuit board, the transmitter, the receiver, and the rigid optical waveguide elements form a detection device; and the housing encloses the detection device except at the slot-shaped opening.

The franking machine preferably has a printing head positioned, when in a printing position, such that the monitoring location is provided, relative to a flow direction of mail items, upstream from the printing head.

Other features which are considered as characteristic for the invention are set forth in the appended claims.

Although the invention is illustrated and described herein as embodied in a configuration for detecting mail items, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE EMBODIMENTS

DESCRIPTION OF THE PREFERRED EMBODIMENTS

Figure 1:
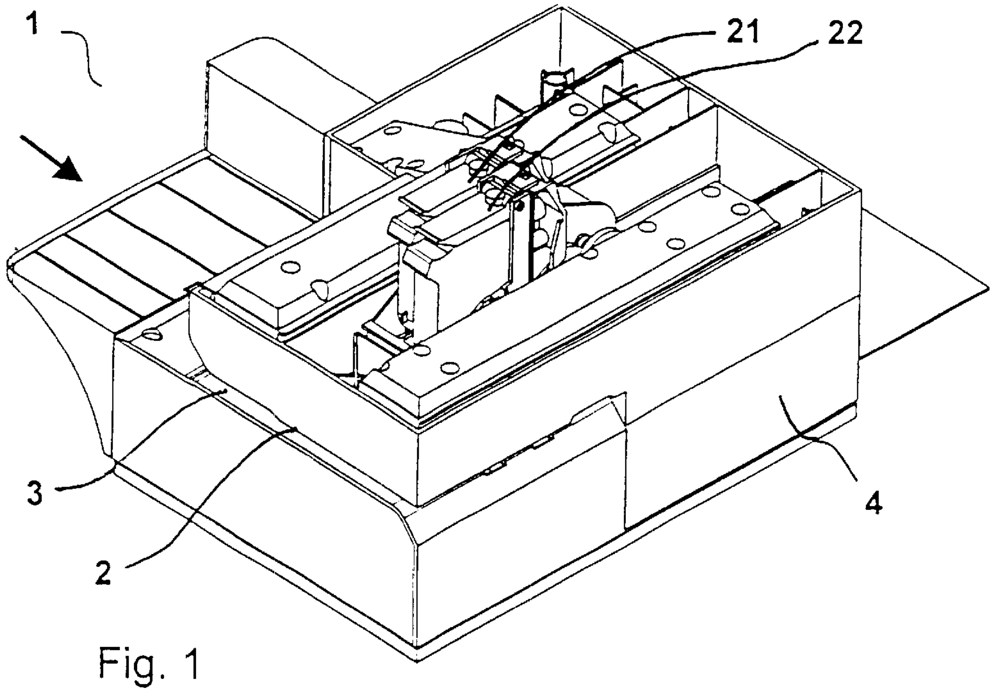
FIG. 1 is a diagrammatic, perspective view of a franking machine open at the top.

Referring now to the figures of the drawings in detail and first, particularly, to FIG. 1 thereof, there is shown a perspective view of a franking machine 1 open at the top. The mail items are fed in through a slot-shaped opening 3 in the housing 4, which in the closed state encloses the configuration for mail item detection except at the opening. The direction of transport of a fed-in mail item (not shown) is indicated by an arrow and runs from top left to bottom right. During transport the mail item comes to lie against a guide plate 2. The housing 4 open at the top shows two printing heads 21, 22 located in printing position.

Figure 2:
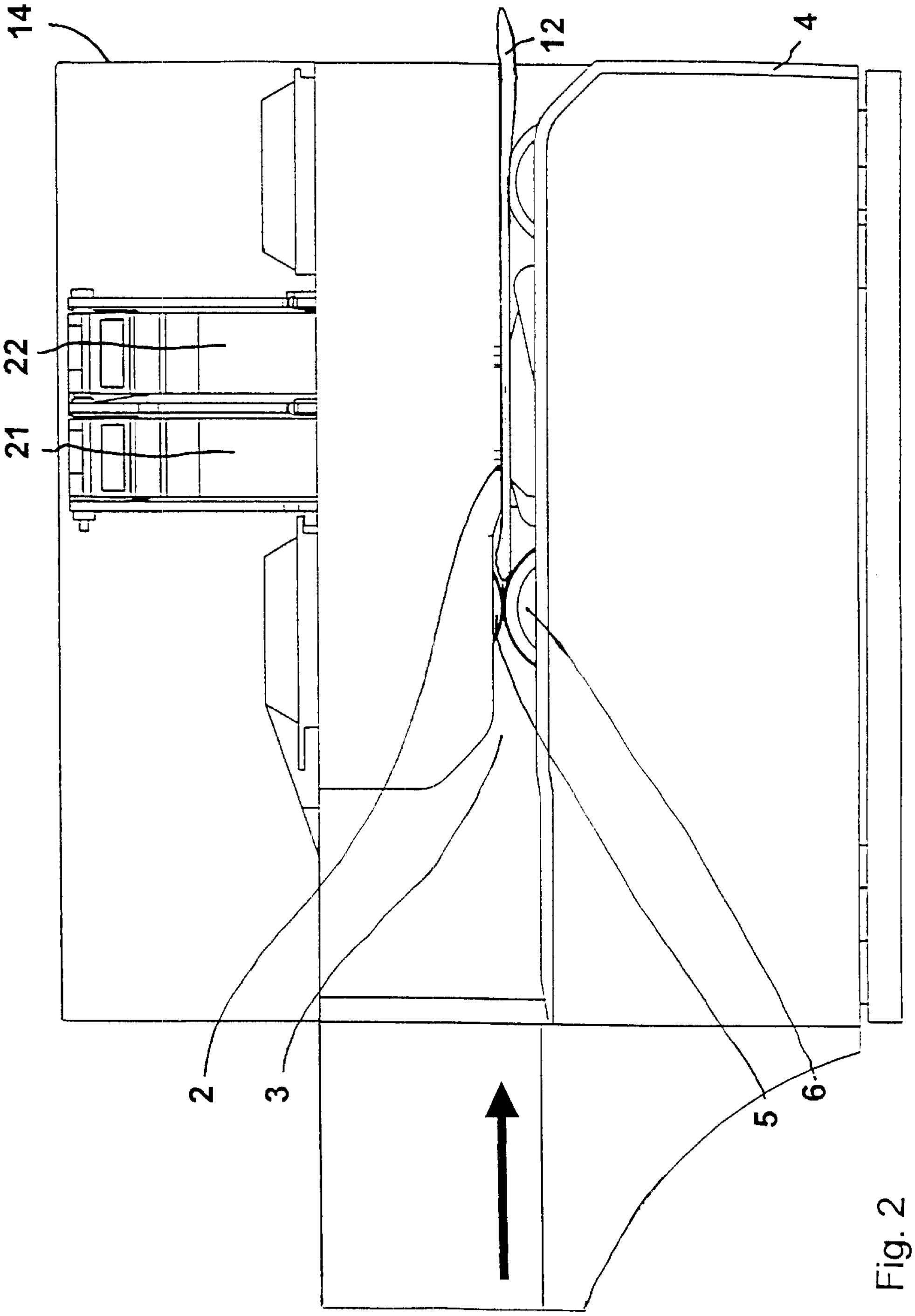
FIG. 2 is a diagrammatic front view of a franking machine transparent on top.

FIG. 2 shows a front view of the franking machine 1, which in this case—solely for purposes of clearer illustration—is fitted with a transparent top cover 14. One side of the opening 3 is constructed as a guide plate 2, against which the mail item 12 lies and starting from which a drive device 5 exerts a transporting force on the mail item 12 in the transport direction (arrow). The counter-pressure device 6 is provided on the opposite side of the opening 3 and sprung-mounted perpendicularly to the transport direction for a fed-in mail item 12. The transport direction for a fed-in mail item 12 runs from left to right.

Figure 3:
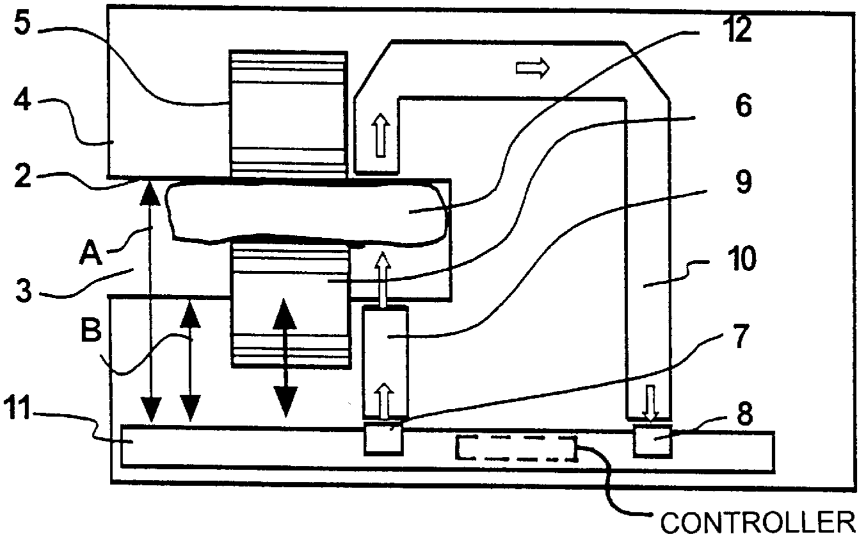
FIG. 3 is a diagrammatic, sectional side view of a franking machine.

FIG. 3 shows a section through the franking machine in side view, whereby the section runs through the monitoring location. The franking machine 1 has a housing 4, inside which is provided a main printed circuit board 11 with a transmitting device 7 and a receiving device 8 and the associated rigid optical waveguide elements 9 and 10. A controller for controlling the franking machine is only schematically illustrated as a dashed box. Of course the controller may be provided as several components on the main circuit board.

The main printed circuit board 11 is provided at a distance A from the guide plate 2 on one side of the opening and at a distance B from the opposite side, whereby distance A>distance B. Rigid optical waveguide elements 9, 10 are provided at the monitoring location on both sides of the opening near the transport path. One rigid optical waveguide element 9 provided at the transmitting device 7 is I-shaped and has a length approximately equal to the distance B. It is provided that a clocked light emitting diode (LED) is used as a transmitting device in a franking machine in order to minimize light from external sources and to increase the reliability of detection.

A further rigid optical waveguide element 10 is U-shaped, whereby one of the legs located near the transport path is shortened by a length approximately equal to the distance A.

The length of the other leg is formed such as to reach approximately to the receiving device 8.

It is provided that the rigid optical waveguide elements 9, 10 for fixing and concentrating the light (white arrow) are formed as transparent plastic optical waveguides. The plastic optical waveguides are preferably formed of polycarbonate or acryl.

A drive device 5 can, for example, be a drive roller and a counter-pressure device 6 can, for example, be a counter-pressure roller. However, the drive device 5 and the counter-pressure device 6 can also be constructed in any other way. The transmitting device 7 and receiving device 8 can be a laser diode, an LED and a photodiode, a phototransistor or a different suitable light source or optoelectric receiver. Preferably a transmitting diode 7 is used with a very narrow transmission angle and high pulse load capacity and reliability. An example of a suitable device is a GaAs infrared light-emitting diode of the type LD 274 available from the company Siemens. As an example for a phototransistor an NPN silicon phototransistor of the type SFH 300 from the company Siemens can be used. Needless to say, the assignment of the rigid optical waveguide elements 9, 10 to the transmitting device 7 and the receiving device 8 can be reversed, i.e. a rigid optical waveguide element 9 assigned to the transmitting device 7 is U-shaped and a rigid optical waveguide element assigned to the receiving device 8 is I-shaped.

The invention is not limited to the above embodiments. Rather, a number of variants are possible within the definition of the claims. Thus it is clear that further embodiments of the invention can be developed and/or used which arise from the same basic ideas of the invention and are covered by the associated claims.

I claim:

1. A configuration for detecting mail items, comprising:

a main printed circuit board having a controller, said main printed circuit board defining a monitoring location spaced at a given distance from said main printed circuit board;

a transmitter disposed on said main printed circuit board;

a receiver disposed on said main printed circuit board;

rigid optical waveguide elements provided between the monitoring location and a respective one of said transmitter and said receiver; and said rigid optical waveguide elements being configured, at the monitoring location, in accordance with a transmitted-light principle, for detecting mail items.

2. The configuration according to claim 1, wherein said rigid optical waveguide elements include a first rigid optical waveguide element provided between the monitoring location and said transmitter and a second rigid optical waveguide element provided between the monitoring location and said receiver.

3. The configuration according to claim 1, including:

a housing having a slot-shaped opening formed therein;

said main printed circuit board, said transmitter, said receiver, and said rigid optical waveguide elements being disposed in said housing;

said slot-shaped opening having two sides and defining a transport path; and said rigid optical waveguide elements being disposed, at the monitoring location and close to the transport path, at a respective one of said two sides of said slot-shaped opening.

4. The configuration according to claim 3, wherein:

said main printed circuit board, said transmitter, said receiver, and said rigid optical waveguide elements form a detection device; and said housing encloses said detection device except at said slot-shaped opening.

5. The configuration according to claim 3, wherein:

the given distance is a first distance;

said two sides of said slot-shaped opening are disposed opposite one another;

a guide plate is formed at a first one of said two sides, said guide plate is configured such that a mail item rests against said guide plate and such that a transport force is exerted on the mail item in a direction of transport; and said main printed circuit board is provided at the first distance from said guide plate and at a second distance from a second one of the two sides wherein the first distance is greater than the second distance.

6. The configuration according to claim 5, wherein:

one of said rigid optical waveguide elements is disposed at one of said transmitter and said receiver; and said one of said rigid optical waveguide elements is an I-shaped, rigid optical waveguide element and has a length substantially equal to the second distance.

7. The configuration according to claim 1, wherein:

one of said rigid optical waveguide elements is disposed at one of said transmitter and said receiver; and said one of said rigid optical waveguide elements is an I-shaped, rigid optical waveguide element.

8. The configuration according to claim 1, wherein:

one of said rigid optical waveguide elements is a U-shaped, rigid optical waveguide element with a first leg and a second leg;

said first leg has a first length such that said first leg substantially reaches one of said transmitter and said receiver;

said second leg has a second length, the second length is shortened by a length substantially equal to the given distance; and said second leg is disposed closer to a transport path at the monitoring location than said first leg.

9. The configuration according to claim 1, wherein said rigid optical waveguide elements are transparent plastic optical waveguides for localizing and concentrating a light beam.

10. The configuration according to claim 1, wherein said transmitter is a clocked light-emitting diode for minimizing extraneous light and for increasing detection reliability.

11. The configuration according to claim 1, including a printing head located, when in a printing position, downstream of the monitoring location with respect to a transport direction.

12. A franking machine configuration, comprising:

a franking machine including a housing, said housing having a slot-shaped opening formed therein;

a main printed circuit board having a controller, said main printed circuit board defining a monitoring location spaced at a given distance from said main printed circuit board;

a transmitter disposed on said main printed circuit board;

a receiver disposed on said main printed circuit board;

rigid optical waveguide elements provided between the monitoring location and a respective one of said transmitter and said receiver;

said rigid optical waveguide elements being configured, at the monitoring location, in accordance with a transmitted-light principle, for detecting mail items;

said main printed circuit board, said transmitter, said receiver, and said rigid optical waveguide elements form a detection device; and said housing encloses said detection device except at said slot-shaped opening.

13. The franking machine according to claim 12, including a printing head positioned, when in a printing position, such that the monitoring location is provided, relative to a flow direction of mail items, upstream from said printing head.

* * * * *